(12) United States Patent
Hodges

(10) Patent No.: US 10,171,030 B2
(45) Date of Patent: Jan. 1, 2019

(54) METHOD OF AMPLIFYING POWER

(71) Applicant: IsoLine Component Company, LLC, Gilbert, AZ (US)

(72) Inventor: Michael Jon Hodges, Gilbert, AZ (US)

(73) Assignee: IsoLine Component Company, LLC, Gilbert, AZ (US)

( * ) Notice: Subject to any disclaimer, the term of this patent is extended or adjusted under 35 U.S.C. 154(b) by 83 days.

(21) Appl. No.: 15/084,311

(22) Filed: Mar. 29, 2016

(65) Prior Publication Data

US 2016/0211800 A1 Jul. 21, 2016

Related U.S. Application Data

(62) Division of application No. 13/326,002, filed on Dec. 14, 2011, now abandoned.

(Continued)

(51) Int. Cl.
*H02J 1/00* (2006.01)
*H02S 99/00* (2014.01)
(Continued)

(52) U.S. Cl.
CPC ............... *H02S 99/00* (2013.01); *H02J 1/00* (2013.01); *H02S 40/22* (2014.12); *H04B 10/807* (2013.01); *Y10T 307/50* (2015.04)

(58) Field of Classification Search
CPC ............... H01L 31/0586; H01L 31/055; H01L 31/02325; H01L 31/0522; H01L 31/0524;
(Continued)

(56) References Cited

U.S. PATENT DOCUMENTS 2,259,372 A 10/1941 Geisler
2,531,000 A 11/1950 Scott
(Continued)

FOREIGN PATENT DOCUMENTS

ES 1072543 U 7/2010
JP 2004320976 A 11/2004
(Continued)

OTHER PUBLICATIONS

Machine translation of ES1072543U.
(Continued)

*Primary Examiner* — Eric R Smith
(74) *Attorney, Agent, or Firm* — Schmeiser, Olsen & Watts LLP

(57) ABSTRACT

The present invention relates to power supplies and in particular to an electronic power supply that is mounted to a printed circuit board and can be used to power electronic circuits and devices. Disclosed is a power supply which includes a photoluminescent light source. The photoluminescent light source generates light in response to receiving input power. One or more than one photovoltaic device is in optical communication with the photoluminescent light source, and generates output power in response to receiving light from the photoluminescent light source. The amount of output power generated by the one or more than one photovoltaic device is greater than the amount of input power received by the photoluminescent light source. In some embodiments the photoluminescent light source includes a light-emitting device and a photoluminescent material, each of which is embedded in an optical coupling material.

4 Claims, 10 Drawing Sheets

Related U.S. Application Data

(60) Provisional application No. 61/435,996, filed on Jan. 25, 2011.

(51) Int. Cl.
    *H02S 40/22*     (2014.01)
    *H04B 10/80*     (2013.01)

(58) Field of Classification Search
    CPC ............. H01L 31/0525; H01L 31/0258; H01L 31/0527; H01L 31/02327; H04B 10/807; F21S 9/037; H02S 40/32; H02S 99/00; G02B 2006/12157; G02B 6/2746; G02B 6/4295; G02B 5/08–5/0875; G02F 1/0955
    USPC .................................................. 136/243–265
    See application file for complete search history.

(56) References Cited

U.S. PATENT DOCUMENTS

| | | | |
|---|---|---|---|
| 3,737,857 A | 6/1973 | Carman | |
| 4,130,445 A | 12/1978 | Blieden | |
| 4,153,813 A | 5/1979 | Blieden et al. | |
| 4,155,371 A | 5/1979 | Wohlmut et al. | |
| 4,159,212 A | 6/1979 | Yerkes | |
| 4,173,495 A | 11/1979 | Rapp et al. | |
| 4,175,980 A | 11/1979 | Davis et al. | |
| 4,188,239 A | 2/1980 | Boling | |
| 4,190,465 A | 2/1980 | Boling | |
| 4,251,288 A | 2/1981 | Yerkes | |
| 4,268,709 A | 5/1981 | Baling | |
| 4,357,486 A | 11/1982 | Blieden et al. | |
| 4,628,143 A | 12/1986 | Bratz | |
| 4,713,493 A | 12/1987 | Ovshinsky | |
| 4,742,278 A | 5/1988 | Iannini | |
| 4,745,294 A | 5/1988 | Kohashi et al. | |
| 5,008,579 A | 4/1991 | Conley et al. | |
| 5,039,354 A * | 8/1991 | Nakagawa | H01L 31/02168 136/249 |
| 5,124,610 A | 6/1992 | Conley et al. | |
| 5,196,781 A * | 3/1993 | Jamieson | H02J 7/35 136/291 |
| 5,235,232 A | 8/1993 | Conley et al. | |
| 5,237,233 A | 8/1993 | Connley | |
| 5,714,012 A | 2/1998 | Murata et al. | |
| 5,828,074 A | 10/1998 | Pearlman | |
| 6,452,088 B1 | 9/2002 | Schmidt | |
| 6,655,814 B1 | 12/2003 | Tagawa et al. | |
| 6,660,929 B2 | 12/2003 | Nelson | |
| 7,387,400 B2 | 6/2008 | Nakata et al. | |
| 7,541,537 B2 | 6/2009 | Madigan | |
| 2004/0155531 A1 | 8/2004 | Agostinelli | |
| 2006/0152140 A1 | 7/2006 | Brandes | |
| 2006/0172148 A1 | 8/2006 | Murayama et al. | |
| 2007/0007844 A1 | 1/2007 | Barbat | |
| 2007/0018558 A1 | 1/2007 | Chua et al. | |
| 2007/0062572 A1 | 3/2007 | Judd et al. | |
| 2007/0199591 A1 | 8/2007 | Harder et al. | |
| 2007/0295383 A1 | 12/2007 | Li et al. | |
| 2008/0289678 A1 | 11/2008 | Rouda | |
| 2008/0302415 A1 | 12/2008 | Buller et al. | |
| 2008/0302418 A1 | 12/2008 | Buller et al. | |
| 2009/0044861 A1 | 2/2009 | Debije et al. | |
| 2009/0050201 A1 | 2/2009 | Fortmann | |
| 2009/0056791 A1 | 3/2009 | Pfenninger et al. | |
| 2009/0065040 A1 | 3/2009 | Tatarinov | |
| 2009/0084963 A1 * | 4/2009 | Kost | H01L 31/02168 250/370.01 |
| 2009/0095341 A1 | 4/2009 | Pfenninger et al. | |
| 2009/0151776 A1 | 6/2009 | Schindler | |
| 2009/0194160 A1 | 8/2009 | Chin et al. | |
| 2009/0211631 A1 | 8/2009 | Temchenko et al. | |
| 2009/0244488 A1 | 10/2009 | Tang | |
| 2009/0277494 A1 | 11/2009 | Mazzer et al. | |
| 2009/0308441 A1 | 12/2009 | Nayfeh et al. | |
| 2010/0000602 A1 | 1/2010 | Gray et al. | |
| 2010/0012167 A1 | 1/2010 | Milshtein et al. | |
| 2010/0018135 A1 | 1/2010 | Croft et al. | |
| 2010/0096000 A1 | 4/2010 | Andrade | |
| 2010/0116312 A1 | 5/2010 | Peumans et al. | |
| 2010/0132765 A1 | 6/2010 | Cumpston et al. | |
| 2010/0133987 A1 | 6/2010 | Huang et al. | |
| 2010/0139765 A1 | 6/2010 | Mapel | |
| 2010/0139769 A1 | 6/2010 | Mapel | |
| 2010/0147367 A1 | 6/2010 | Cumpston et al. | |
| 2010/0180937 A1 | 6/2010 | Jain et al. | |
| 2010/0180932 A1 | 7/2010 | Wang et al. | |
| 2010/0206355 A1 | 8/2010 | Johnson | |
| 2010/0224248 A1 | 9/2010 | Kenney et al. | |
| 2010/0229908 A1 | 9/2010 | Van Steenwyk et al. | |
| 2010/0236625 A1 | 9/2010 | Kenney et al. | |
| 2010/0243051 A1 | 9/2010 | Slager | |
| 2010/0243053 A1 | 9/2010 | Coe-Sullivan et al. | |
| 2010/0252090 A1 | 10/2010 | Milshtein et al. | |
| 2010/0275999 A1 | 11/2010 | Buelow, II | |
| 2010/0281721 A1 | 11/2010 | Chen et al. | |
| 2010/0283266 A1 | 11/2010 | Shafiq et al. | |
| 2010/0288333 A1 | 11/2010 | Temchenko et al. | |
| 2011/0017255 A1 | 1/2011 | Fuller | |
| 2011/0284053 A1 | 11/2011 | Brewer | |
| 2012/0111400 A1 * | 5/2012 | Wakefield | G02B 1/113 136/256 |
| 2012/0187763 A1 | 7/2012 | Hodges | |

FOREIGN PATENT DOCUMENTS

| | | |
|---|---|---|
| WO | 2008018672 A1 | 2/2008 |
| WO | 2010102408 A1 | 9/2010 |

OTHER PUBLICATIONS

Machine translation of JP2004-320976A.
C. Honsberg and S. Bowden, "Quantum Efficiency", [retrieved from internet at http://www.pveducation.org/pvcdrom/solar-cell-operation/quantum-efficiency on Sep. 8, 2014].

* cited by examiner

METHOD OF AMPLIFYING POWER

CROSS REFERENCE TO RELATED APPLICATIONS

This application claims priority to U.S. patent application Ser. No. 13/326,002, filed Dec. 14, 2011 and entitled "Electronic Power Supply", which in turn claims priority to U.S. Provisional patent application entitled "Electronic Power Supply," Ser. No. 61/435,996, filed Jan. 25, 2011, the disclosure of which is hereby incorporated entirely herein by reference.

BACKGROUND OF THE INVENTION

Technical Field

This invention relates generally to power supplies and in particular to an electronic power supply that is mounted to a printed circuit board and can be used to power electronic circuits and devices.

State of the Art

Power supplies for electronic circuit boards are devices which mount to a printed circuit board and condition the power that is used or supplied by the printed circuit board. Printed circuit board power supplies condition power for use in many different ways. Power supplies are often used to regulate, convert, or transform power. Often input power of a particular voltage and current is supplied to the printed circuit board and the power supply. The power supply will often take the input power and perform some conditioning, or operation on the power before outputting the power to the printed circuit board and/or external components. Sometimes the power supply changes the input voltage or current to a different voltage or current needed by the printed circuit board (PCB). In some cases the power supply creates a number of different voltage and current levels and makes them available to the PCB. In some cases the power supply transforms the power from a direct current to an alternating current, or vice versa. There are many ways in which power supplies condition power. Typically these power supplies are inefficient, requiring more input power than they supply as output power. It is desirable to have a power supply that can generate power as well as condition power. Additionally, power supplies are often noisy and can transfer noise from the input power signal to the output power signal. It is desirable to have a power supply which provides isolation between the input and output power signals. Accordingly, a power supply is disclosed which can generate power as well as condition the input power, providing a higher level of output power than is consumed as input power. A power supply is disclosed which isolates the output power signal from the input power signal so that electrical noise from the input power signal is not transferred to the output power signal.

DISCLOSURE OF THE INVENTION

The present invention relates to power supplies and in particular to an electronic power supply that is mounted to a printed circuit board and can be used to power electronic circuits and devices.

Disclosed is a power supply that includes a light source and one or more than one photovoltaic device. The light source emits light in response to receiving light source electrical power. The light source electrical power is provided by a power source external to the power supply. The one or more than one photovoltaic device outputs photovoltaic-generated electrical power in response to receiving light from the light source. The amount of photovoltaic-generated electrical power output from the photovoltaic device is greater than the amount of light source electrical power received by the light source.

In some embodiments the light source includes a light-emitting device, where the light-emitting device emits light of a first peak wavelength in response to receiving the light source electrical power. In some embodiments the light source includes a first photoluminescent material in optical communication with the light-emitting device, where the first photoluminescent material generates light of a second peak wavelength in response to receiving light of the first peak wavelength from the light-emitting device. In some embodiments the power supply includes a block of optical coupling material, where the light-emitting device and the first photoluminescent material are both embedded in the block of optical coupling material. In some embodiments the one or more than one photovoltaic device is embedded in the block of optical coupling material. In some embodiments the one or more than one photovoltaic device includes the light source.

Disclosed is a power supply that includes a power conditioning module. The power conditioning module includes a light source and one or more than one photovoltaic device. The light source emits light in response to receiving light source electrical power. The one or more than one photovoltaic device outputs photovoltaic-generated electrical power in response to receiving light from the light source. The power supply also includes a power distribution circuit. The power distribution circuit includes a light source power distribution circuit, and a power output circuit. The light source power distribution circuit receives input power from a power source external to the power supply, and generates light source electrical power in response. The power output circuit receives photovoltaic-generated electrical power from the one or more than one photovoltaic device, and provides power supply output power in response. The amount of input power received by the light source power distribution circuit is less than the amount of power supply output power provided by the power output circuit.

In some embodiments the power supply includes a block of optical coupling material and one or more than one light-emitting device embedded in the block of optical coupling material. The one or more than one light-emitting device emits light of a first peak wavelength in response to receiving the light source electrical power. The block of optical coupling material optically couples the one or more than one light emitting device to the one or more than one photovoltaic device. To optically couple two elements means to create, form, or cause to exist a path for optical transmission from one of the elements to the other and/or vice versa. Optical coupling material is a material that light passes through to get from one element to another. In some embodiments the block of optical coupling material includes a light source top surface, a light source bottom surface, a light source front surface, and a light source back surface. The light source emits light from the light source top surface, the light source bottom surface, the light source front surface, and the light source back surface in response to receiving the light source electrical power. In some embodiments the one or more than one photovoltaic device includes a top photovoltaic device, a bottom photovoltaic device, a front photovoltaic device, and a back photovoltaic device. The top photovoltaic device generates photovoltaic-generated electrical power in response to receiving light from the light source top surface. The bottom photovoltaic device generates photovoltaic-generated electrical power in response to receiving light from the light source bottom surface. The front photovoltaic device generates photovoltaic-generated electrical power in response to receiving light from the light source front surface. The back photovoltaic device generates photovoltaic-generated electrical power in response to receiving light from the light source back surface. In some embodiments the light source further includes a first photoluminescent material embedded in the block of optical coupling material, where the first photoluminescent material emits light of a second peak wavelength in response to receiving light of the first peak wavelength from the one or more than one light-emitting device. In some embodiments the light source further includes a second photoluminescent material embedded in the block of optical coupling material, where the second photoluminescent material emits light of a third peak wavelength in response to receiving light of the first peak wavelength from the one or more than one light-emitting device. In some embodiments the light-emitting device emits light in the blue range of the visible spectrum. In some embodiments the first photoluminescent material emits light in the green range of the visible spectrum.

Disclosed is a method of amplifying power for components mounted on a printed circuit board using a printed circuit board-mounted power supply. The method according to the invention includes the step of optically coupling one or more than one photovoltaic device to a photoluminescent light source, where the one or more than one photovoltaic device receives light from the photoluminescent light source. The method also includes the step of supplying light source electrical input power to the photoluminescent light source, where the light source electrical input power is received from a power source external to the printed circuit board-mounted power supply. The method according to the invention also includes the step of collecting photovoltaic-generated electrical output power from the one or more than one photovoltaic device, where the amount of photovoltaic-generated electrical output power collected from the one or more than one photovoltaic device is greater than the amount of light source electrical input power supplied to the photoluminescent light source. The method according to the invention also includes the step of providing the photovoltaic-generated electrical output power to components mounted on the printed circuit board.

In some embodiments the method of amplifying power for components mounted on a printed circuit board using a printed circuit board-mounted power supply according to the invention includes the step of creating a photoluminescent light source. In some embodiments the step of creating a photoluminescent light source includes the step of optically coupling a light-emitting device to a photoluminescent material. In some embodiments creating a photoluminescent light source includes the step of embedding the light-emitting device in a block of optical coupling material. In some embodiments creating a photoluminescent light source includes the step of embedding the photoluminescent material in the block of optical coupling material. In some embodiments the photoluminescent material is a first photoluminescent material and creating a photoluminescent light source further comprises the step of embedding a second photoluminescent material in the block of optical coupling material. In some embodiments the method includes the step of embedding the one or more than one photovoltaic device in the block of optical coupling material.

Disclosed is a power supply which includes a photoluminescent light source. The photoluminescent light source generates light in response to receiving input power. The power supply according to the invention also includes one or more than one photovoltaic device in optical communication with the photoluminescent light source. The one or more than one photovoltaic device generates output power in response to receiving light from the photoluminescent light source, where the amount of output power generated by the one or more than one photovoltaic device is greater than the amount of input power received by the photoluminescent light source. In some embodiments one or more of the photovoltaic devices is an organic material photovoltaic solar cell. In some embodiments the photoluminescent light source includes a light-emitting device in optical communication with a photoluminescent material. In some embodiments the photoluminescent light source includes a light-emitting device and a photoluminescent material, each of which is embedded in an optical coupling material. In some embodiments the light-emitting device is a light-emitting diode. In some embodiments more than one photoluminescent material is included in the photoluminescent light source.

A power supply is disclosed which includes a photoluminescent material in optical communication with a light-emitting device, where the photoluminescent material emits light in response to absorbing light received from the light-emitting device. The power supply also includes one or more than one photovoltaic devices in optical communication with the photoluminescent material, where the one or more than one photovoltaic devices generate electrical power in response to receiving light from the photoluminescent material. The amount of electrical power generated by the photovoltaic devices is greater than the amount of electrical power consumed by the light-emitting device.

A method of amplifying power is disclosed which includes the steps of obtaining a photoluminescent light source, and optically coupling one or more than one photovoltaic device to the photoluminescent light source. The method of amplifying power also includes supplying input power to the photoluminescent light source, and collecting output power from the one or more than one photovoltaic devices, wherein the amount of output power collected from the one or more than one photovoltaic devices is greater than the amount of input power supplied to the photoluminescent light source.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
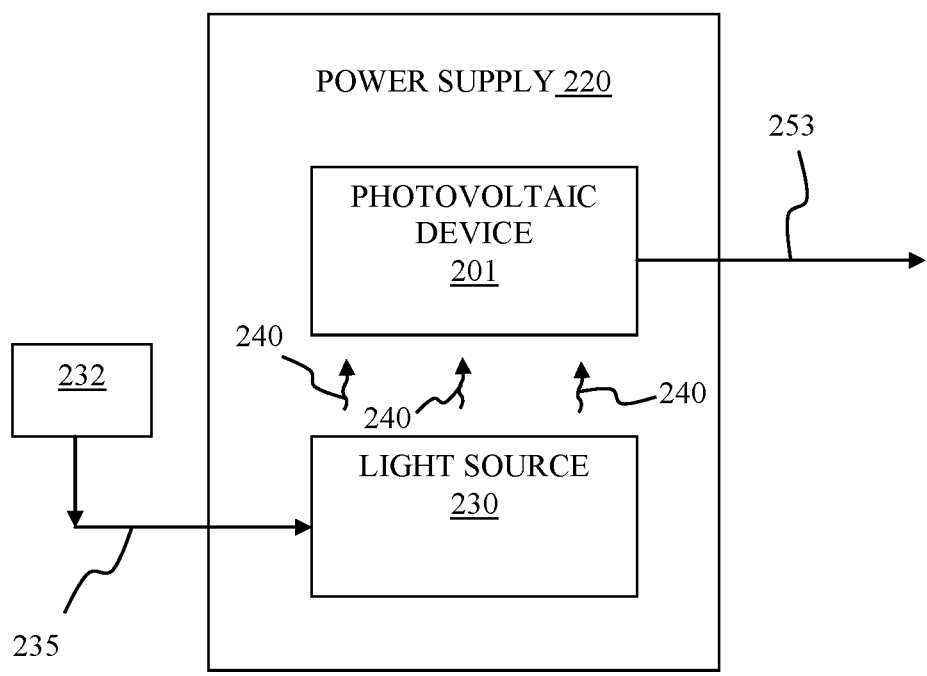
FIG. 1 shows a block diagram of an embodiment of power supply 220 according to the invention.
Figure 2:
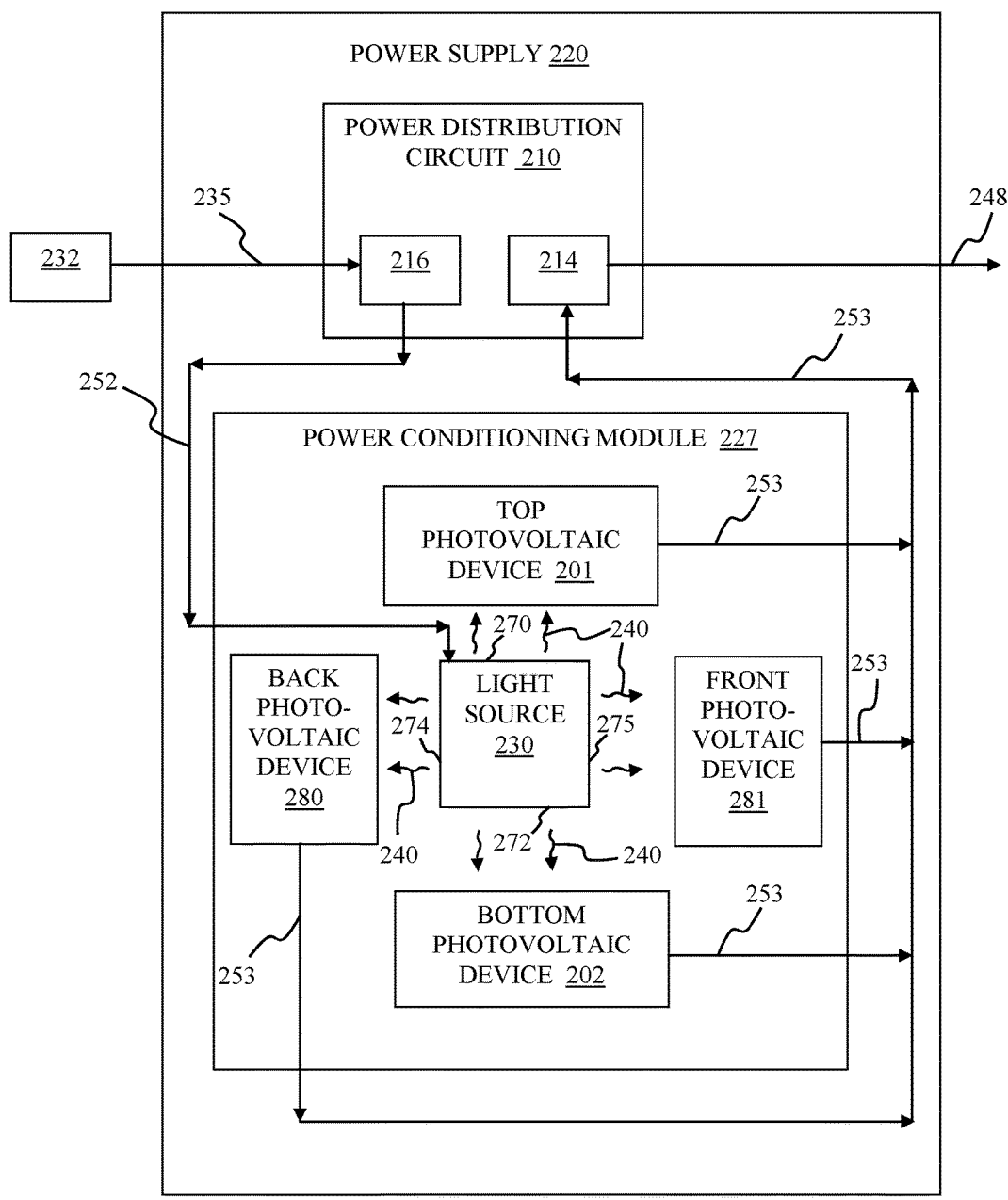
FIG. 2 is a block diagram of another embodiment of power supply 220 according to the invention.
Figure 3:
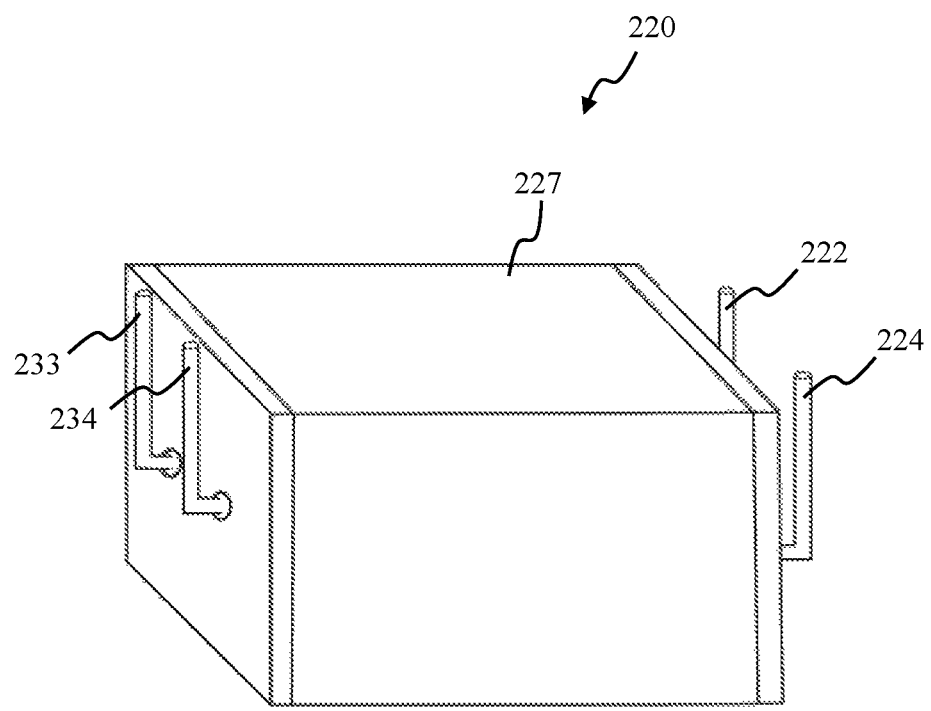
FIG. 3 is a perspective view of the embodiment of power supply 220 of FIG. 2.
Figure 4:
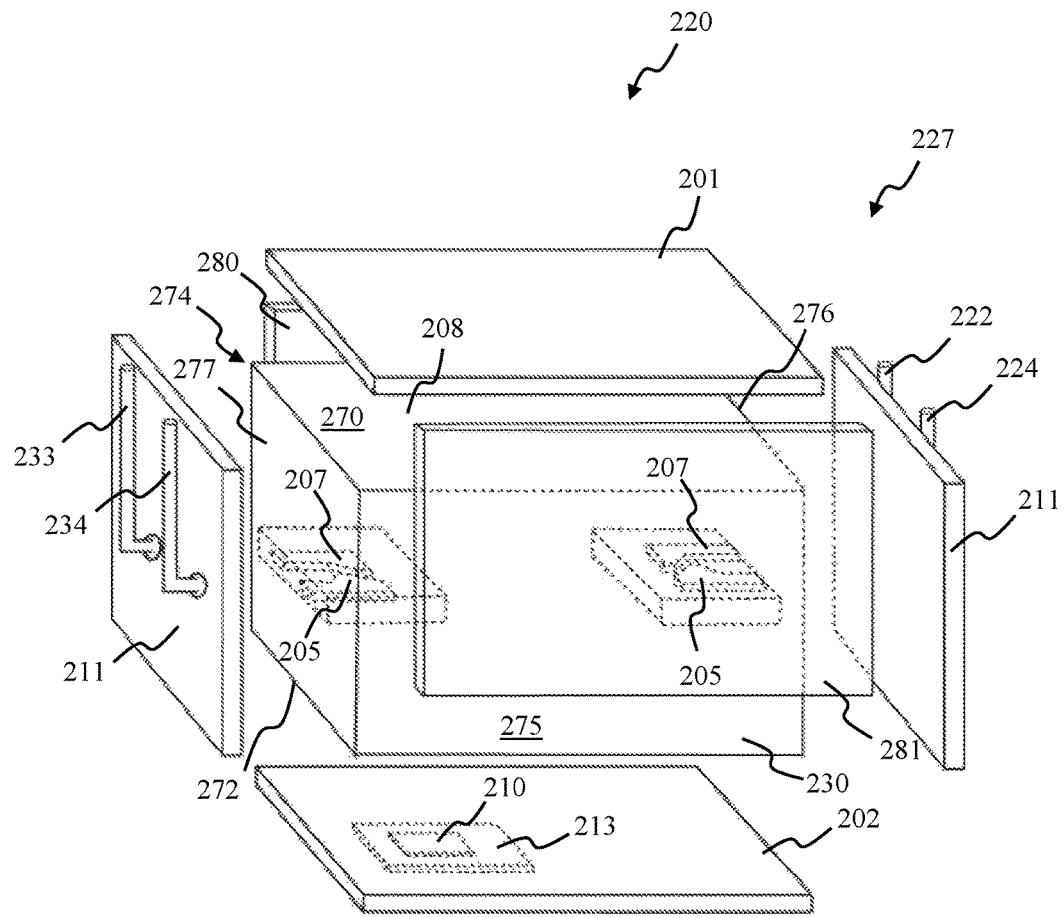
FIG. 4 is an exploded perspective view of the embodiment of power supply 220 of FIG. 2.
Figure 5:
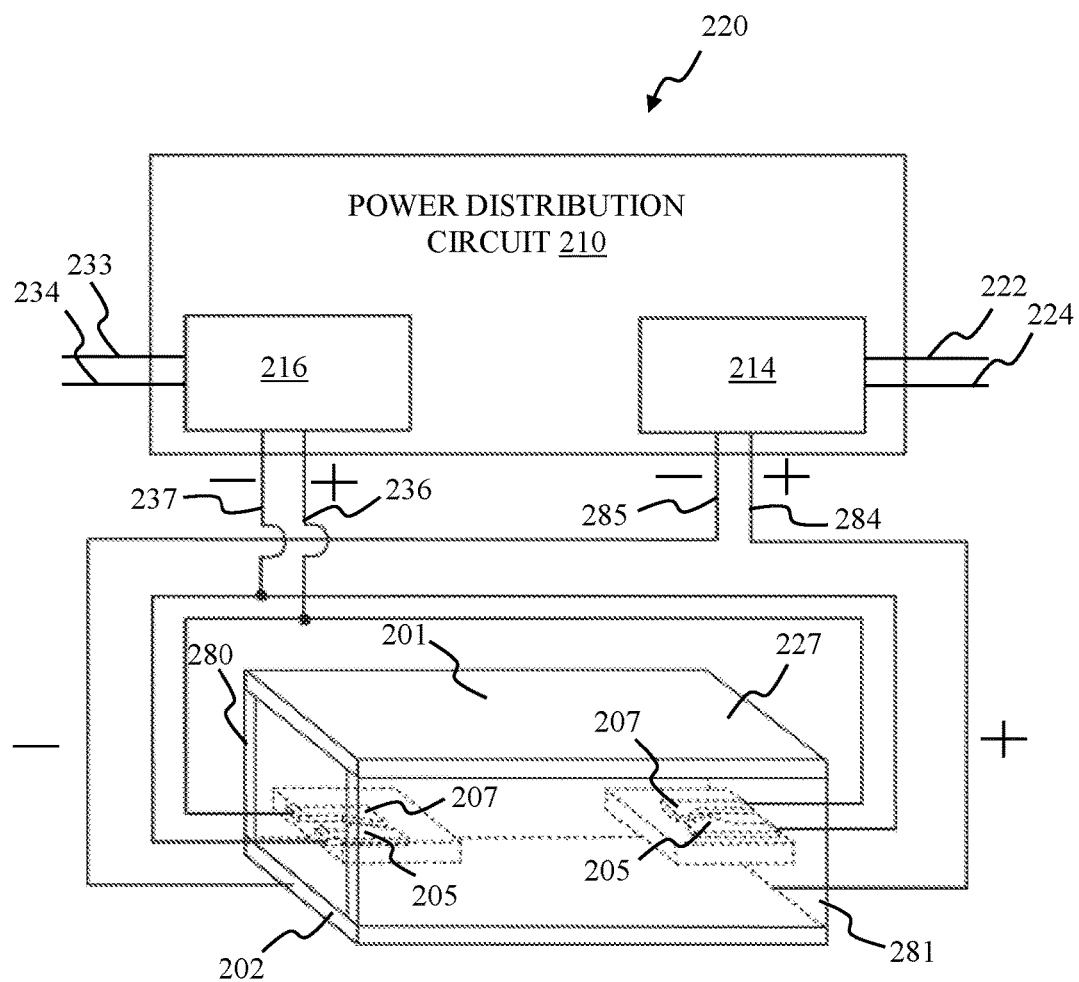
FIG. 5 is a simplified schematic diagram of power supply 220 of FIG. 2.
Figure 6:
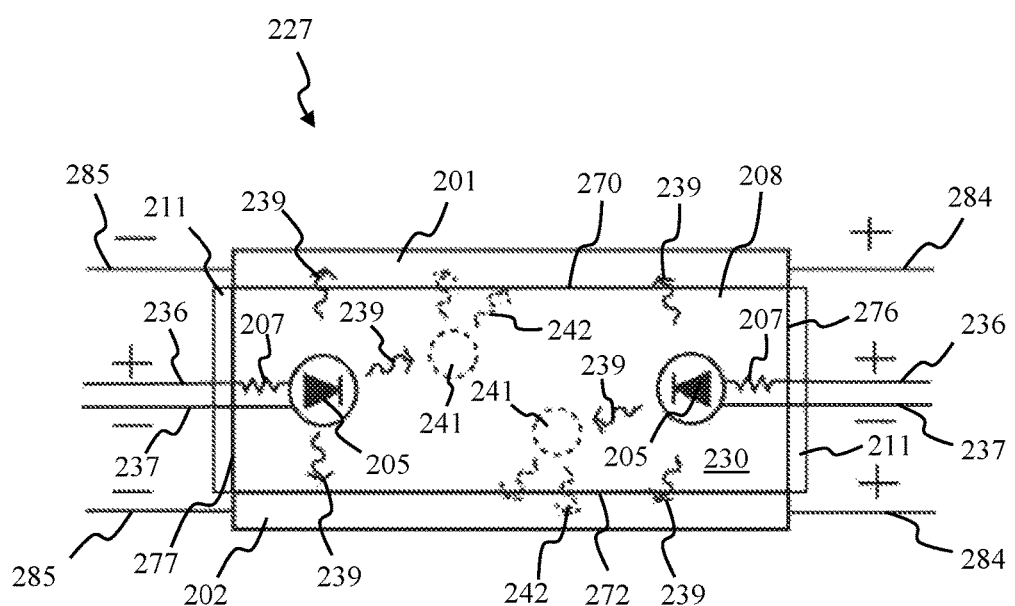
FIG. 6 is a cross-sectional view of an embodiment of power conditioning module 227 of power supply 220 according to the invention.
Figure 7:
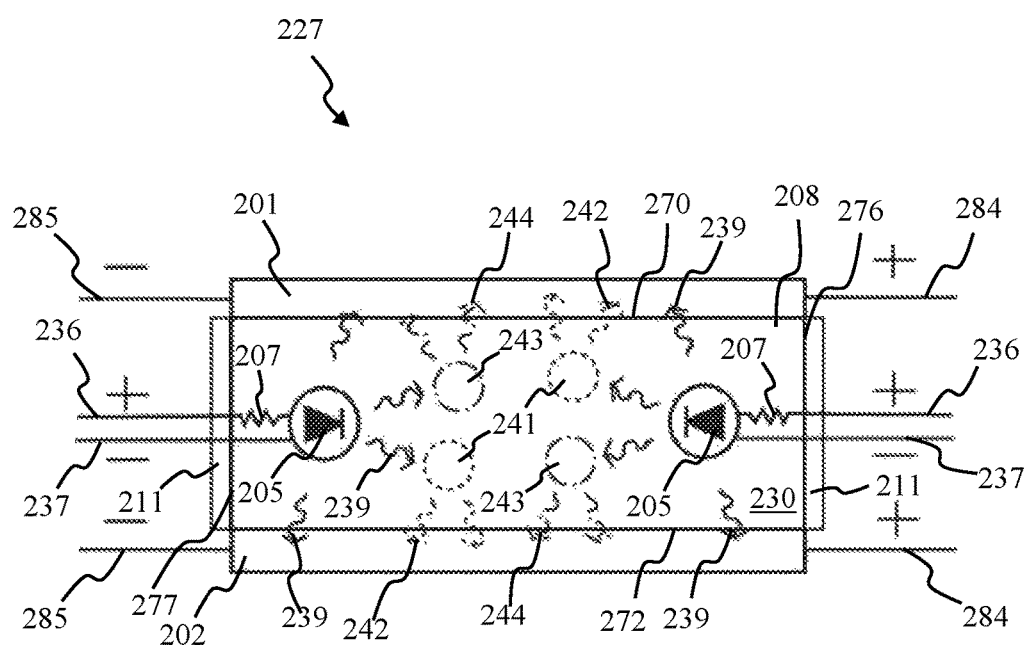
FIG. 7 is a cross-sectional view of power conditioning module 227 of power supply 220 of FIG. 2.
Figure 8:
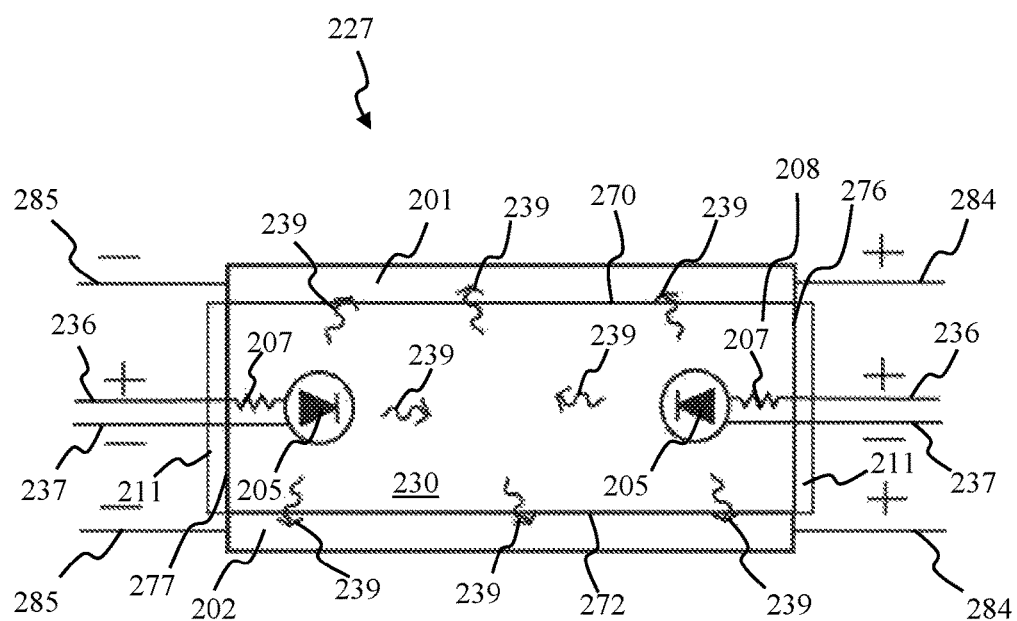
FIG. 8 is a cross-sectional view of an embodiment of power conditioning module 227 of power supply 220 according to the invention.

As discussed above, embodiments of the present invention relate to power supplies and in particular to an electronic power supply that is mounted to a printed circuit board and can be used to power electronic circuits and devices. FIG. 1 and FIG. 2 show block diagrams of embodiments of power supply 220 according to the invention. FIG. 3 shows a perspective view of the embodiment of power supply 220 according to the invention of FIG. 2. FIG. 4 shows an exploded perspective view of power supply 220 of FIG. 2. FIG. 5 shows a simplified schematic view of power supply 220 of FIG. 2. FIG. 6, FIG. 7, and FIG. 8 each show cross-sectional views of embodiments of power conditioning module 227 of power supply 220 of FIG. 2.

Power supply 220 according to the invention uses electro-optical conversions to amplify, generate, and condition electrical power. Power supply 220 is capable of delivering a higher level of output power than is received as input power. This is accomplished by converting input electrical power to optical power, amplifying the optical power by stimulated optical emission, and converting the resultant optical power back into electrical energy. The conversion from electrical to optical power not only provides the opportunity to use light amplification to generate power, it also allows optical isolation between the input and output connections, and allows other useful power conditioning functions. Power supply 220 can be used to provide power to a printed circuit board or an electronic device. Power supply 220 according to the invention can be used to supply power for consumer electronics, audio, communication, telecom, space, wired and wireless communications, and other product applications. Power supply 220 according to the invention can be used to amplify power, to generate power, to perform signal isolation, power conversion or transformation, or other power conditioning functions.

FIG. 1 shows a block diagram of one embodiment of power supply 220 according to the invention. Power supply 220 in this embodiment includes light source 230 and photovoltaic device 201. Light source 230 emits light 240 in response to receiving light source electrical power 235. Light source electrical power 235 is provided by power source 232. Power source 232 is a power source that is external to power supply 220. Photovoltaic device 201 outputs photovoltaic-generated electrical power 253 in response to receiving light 240 from light source 230. The amount of photovoltaic-generated electrical power 253 output from photovoltaic device 201 is greater than the amount of light source electrical power received by light source 230. Power supply 220 generates power using stimulated emission of optical radiation, as will be explained in more detail shortly. Thus power supply 220 is able to supply more output power 253 than is received as input power 232.

Light source 230 can take many different forms, some of which are described in detail later in this document. Light source 230 is any light-emitting element, device, structure, material, or thing which emits light in response to receiving electrical power. In some embodiments light source 230 is a photoluminescent light source. In some embodiments, light source 130 is a combination photoluminescent/electroluminescent light source. Light source 230 of FIG. 1 can be any of the light sources 230 described in this document, or other types of light source 230.

Photovoltaic device 201 can take many different forms. Photovoltaic device 201 is any device, layer, material, structure, or other thing which generates electricity in response to receiving light. In some embodiments photovoltaic device 201 is a solar cell. Photovoltaic device 201 of FIG. 1 can be any of the photovoltaic devices described in this document.

Power source 232 is not a part of power supply 220. Power source 232 provides light source electrical power 235 to power supply 220. Power source 232 can take many different forms. Power source 232 can be any battery, power supply, power generator, or other source of electrical power that is external to power supply 220.

FIG. 2 shows a block diagram of another embodiment of power supply 220 according to the invention. FIG. 3 shows a perspective view of power supply 220 of FIG. 3. FIG. 4 shows an exploded perspective view of power supply 220 of FIG. 2, and FIG. 5 shows a simplified schematic view of power supply 220 of FIG. 2. The embodiment of power supply 220 according to the invention of FIG. 2 through FIG. 5 includes power input connections 233 and 234, which conduct input power 235 to power supply 220. Power supply 220 can be mounted to a PCB or other electronic circuit in any way known in the art or to be developed which allows electrical connections 233 and 234 to receive input power 235. Power supply 220 is often soldered to a printed circuit board. Power supply 220 in this embodiment includes power distribution circuit 210, and power conditioning module 227.

Power distribution circuit 210 processes, routes, and controls the power flowing into and out of power supply 220. Power conditioning module 227 optically conditions the power flowing through power supply 220, as will be discussed shortly. Power distribution circuit 210 receives input power 235 and delivers output power 248. Output power 248 is delivered through connections 222 and 224 in the embodiment shown in FIG. 2 through FIG. 5. In some embodiments of power supply 220, output power 248 is delivered through more than two connections, for example when multiple voltage levels are being delivered as output. In some embodiments of power supply 220, input power 235 is received through more than two input connections.

Power distribution circuit 210 is placed on printed circuit board (PCB) 213 in this embodiment (see FIG. 3). PCB 213 in this embodiment is molded into power conditioning module 227. Electrical connections within power supply 220 are accomplished using electrical traces or wires running along the inside or outside of power conditioning module 227. Input power electrical connections 233 and 234 are connected to power distribution circuit 210 using electrical traces or wires run along the inside of mirror 211 and the outside of photovoltaic device 202. Output power electrical connections 222 and 224 are connected to power distribution circuit 210 using electrical traces or wires run along the inside of mirror 211 and the outside of photovoltaic device 202. PCB 213 can be placed any where on, in, attached to, molded into, or otherwise associated with power conditioning module 227. In some embodiments PCB 213 and power conditioning circuit 210 are an element separate from, but in electrical communication with, power conditioning module 227.

Power distribution circuit 210 includes light source power distribution circuit 216, and power output circuit 214 in the embodiment of power supply 220 shown in FIG. 2 through FIG. 5. Light source power distribution circuit 216 receives input power 235 from power source 232, and generates light source electrical power 252 in response. Light source power distribution circuit 216 receives input power 235 through connections 233 and 234. In some embodiments more than two power input connections are used to deliver input power 235 to power distribution circuit 210 of power supply 220. Light source power distribution circuit 216 receives input power 235, and delivers light source electrical power 252 to light source 230 of power conditioning module 227 in response.

Power output circuit 214 receives photovoltaic-generated electrical power 253 collected from photovoltaic devices 201, 202, 280, and 281, and provides output power 248 in response. Power output circuit 214 provides output power 248 through power output electrical connections 222 and 224 in this embodiment. In some embodiments more than two power output electrical connections are used to deliver output power 248. Power distribution circuit 210 in some embodiments can include many other components and can perform other functions on input power 235 or output power 248 such as conversion, transformation, or other power conditioning functions.

Power distribution circuit 210 delivers light source electrical power 252 to light source 230 of power conditioning module 227 in response to power distribution circuit 210 receiving input power 235. Power conditioning module 227 receives light source electrical power 252 from light source power distribution circuit 216 via electrical connections 236 and 237 in the embodiment shown in FIG. 2 through FIG. 5. Electrical connections 236 and 237 are electrical traces or wires running along the inside or outside of power conditioning module 227. Light source electrical power 252 is used to power light source 230. Light source 230 emits light 240 in response to receiving light source electrical power 252. Light source 230 is in optical communication with photovoltaic devices 201, 202, 280 and 281. Light source 230 is in optical communication with photovoltaic devices 201, 202, 280 and 281 because photovoltaic devices 201, 202, 280, and 282 receive light 240 from light source 230.

Photovoltaic devices 201, 202, 280, and 281 generate photovoltaic-generated electrical power 253 in response to receiving light 240 from light source 230. Light source 230 optically amplifies light source electrical power 252 such that the amount of photovoltaic-generated electrical power 253 generated by power conditioning module 227 is greater than the amount of light source electrical power 252 received by power conditioning module 227. The amount of input power 235 received by power distribution circuit 210 is less than the amount of output power 248 provided by power output circuit 214 due to the power amplification performed by power conditioning module 227. Power conditioning module 227 performs power amplification using light source 230 together with one or more than one photovoltaic device. Light source 230 in this embodiment is a photoluminescent light source, as will be explained shortly with respect to FIG. 6 and FIG. 7, which allows power conditioning module 227 of power source 220 according to the invention to amplify power.

In the embodiment shown in FIG. 2 through FIG. 5, power conditioning module 227 includes four photovoltaic devices, top photovoltaic device 201, bottom photovoltaic device 202, front photovoltaic device 281, and back photovoltaic device 280. In this embodiment light source 230 is surrounded on four sides by photovoltaic devices 201, 202, 280, and 281, as shown in the figures.

In the embodiment shown in FIG. 2 through FIG. 5, light source 230 includes block of optical coupling material 208, and two light-emitting devices 205. Light-emitting devices 205 are embedded in block of optical coupling material 208. Block of optical coupling material 208 optically couples light-emitting devices 205 to photovoltaic devices 201, 202, 280, and 281. To optically couple two elements means to create, form, or cause to exist a path for optical transmission from one of the elements to the other and/or vice versa. Optical coupling material is a material that light passes through to get from one element to another. Block of optical coupling material 208 is an optical grade molding resin in this embodiment. Block of optical coupling material can be any material suitable for optically coupling light-emitting devices 205 and photovoltaic devices 201, 202, 280, and 281.

In some embodiments light source 230 includes one light-emitting device 205. In some embodiments light source 230 includes more than two light-emitting devices 205. In some embodiments light source 230 includes one or more than one light-emitting device 205, where light-emitting device 205 is embedded in block of optical coupling material 208.

In the embodiment shown in FIG. 2 through FIG. 5, block of optical coupling material 208 is rectangular in shape, but this is not meant to be limiting. Block of optical coupling material 208 can be any size or shape. "Block" in this document is mean to mean "piece" such that "block of optical coupling material" means a piece of optical coupling material without regard to size, shape, or configuration.

In the embodiment shown in FIG. 2 through FIG. 5, block of optical coupling material 208 includes light source top surface 270, light source bottom surface 272, light source front surface 275, light source front surface 275, light source back surface 274. Light source first end surface 276, and light source second end surface 277. Light source first end surface 276 and light source second end surface 277 are covered in this embodiment with mirrors 211 as shown. Mirrors 211 reflect light incident on them back into block of optical coupling material 208 of light source 230. Light source 230 in this embodiment emits light 240 from light source top surface 270, light source bottom surface 272, light source front surface 275, and light source back surface 274.

Light source top surface 270 of light source 230 is optically coupled to top photovoltaic device 201. In some embodiments top photovoltaic device 201 is adjacent to top surface 270. In some embodiments top photovoltaic device 201 is optically bonded to top surface 270. In the embodiment shown in FIG. 2 through FIG. 5, top photovoltaic device 201 covers top surface 270, with the light collection surface of top photovoltaic device 201 embedded in top surface 270 such that light 240 emitted by light source 230 through top surface 270 is received by top photovoltaic device 201 without having to travel through an air gap. Thus top photovoltaic device 201 is in optical communication with light source 230. Top photovoltaic device 201 receives light 240 from light source top surface 270 of light source 230.

In the embodiment shown in FIG. 2 through FIG. 5, top photovoltaic device 201 is an organic photovoltaic solar cell which generates photovoltaic-generated electrical power 253 in response to receiving light 240 from light source top surface 270. In some embodiments top photovoltaic device 201 is a silicon photovoltaic device which generates electrical power in response to absorbing light 240. In some embodiments top photovoltaic device 201 is a cadmium telluride photovoltaic device which generates electrical power in response to absorbing light 240. Top photovoltaic device 201 can be any photovoltaic material, layer, module, or device which generates electrical power in response to absorbing light 240.

Light source bottom surface 272 of light source 230 is optically coupled to bottom photovoltaic device 202. In some embodiments bottom photovoltaic device 202 is adjacent to bottom surface 272. In some embodiments bottom photovoltaic device 202 is optically bonded to bottom surface 272. In the embodiment shown in FIG. 2 through FIG. 5, bottom photovoltaic device 202 covers bottom surface 272, with the light collection surface of bottom photovoltaic device 202 embedded in bottom surface 272 such that light 240 emitted by light source 230 through bottom surface 272 is received by bottom photovoltaic device 202 without having to travel through an air gap. Thus bottom photovoltaic device 202 is in optical communication with light source 230. Bottom photovoltaic device 202 receives light 240 from light source bottom surface 272 of light source 230.

In the embodiment shown in FIG. 2 through FIG. 5, bottom photovoltaic device 202 is an organic photovoltaic solar cell which generates photovoltaic-generated electrical power 253 in response to receiving light 240 from light source bottom surface 272. In some embodiments bottom photovoltaic device 202 is a silicon photovoltaic device which generates electrical power in response to absorbing light 240. In some embodiments bottom photovoltaic device 202 is a cadmium telluride photovoltaic device which generates electrical power in response to absorbing light 240. Bottom photovoltaic device 202 can be any photovoltaic material, layer, module, or device which generates electrical power in response to receiving light 240.

Light source front surface 275 of light source 230 is optically coupled to front photovoltaic device 281. In some embodiments front photovoltaic device 281 is adjacent to front surface 275. In some embodiments front photovoltaic device 281 is optically bonded to front surface 275. In the embodiment shown in FIG. 2 through FIG. 5, front photovoltaic device 281 covers front surface 275, with the light collection surface of front photovoltaic device 281 embedded in front surface 275 such that light 240 emitted by light source 230 through front surface 275 is received by front photovoltaic device 281 without having to travel through an air gap. Thus front photovoltaic device 281 is in optical communication with light source 230. Front photovoltaic device 281 receives light 240 from front surface 275 of light source 230.

In the embodiment shown in FIG. 2 through FIG. 5, front photovoltaic device 281 is an organic photovoltaic solar cell which generates photovoltaic-generated electrical power 253 in response to receiving light 240 from front surface 275. In some embodiments front photovoltaic device 281 is a silicon photovoltaic device which generates electrical power in response to absorbing light 240. In some embodiments front photovoltaic device 281 is a cadmium telluride photovoltaic device which generates electrical power in response to absorbing light 240. Front photovoltaic device 281 can be any photovoltaic material, layer, module, or device which generates electrical power in response to receiving (absorbing) light.

Light source back surface 274 of light source 230 is optically coupled to back photovoltaic device 280. In some embodiments back photovoltaic device 280 is adjacent to back surface 274. In some embodiments back photovoltaic device 280 is optically bonded to back surface 274. In the embodiment shown in FIG. 2 through FIG. 5, back photovoltaic device 280 covers back surface 274, with the light collection surface of back photovoltaic device 280 embedded in back surface 274 such that light 240 emitted by light source 230 through back surface 274 is received by back photovoltaic device 280 without having to travel through an air gap. Thus back photovoltaic device 280 is in optical communication with light source 230. Back photovoltaic device 280 receives light 240 from back surface 274 of light source 230.

In the embodiment shown in FIG. 2 through FIG. 5, back photovoltaic device 280 is an organic photovoltaic solar cell which generates photovoltaic-generated electrical power 253 in response to receiving light 240 from back surface 274 of light source 230. In some embodiments back photovoltaic device 280 is a silicon photovoltaic device which generates electrical power in response to absorbing light 240. In some embodiments back photovoltaic device 280 is a cadmium telluride photovoltaic device which generates electrical power in response to absorbing light 240. Back photovoltaic device 280 can be any photovoltaic material, layer, module, or device which generates electrical power in response to absorbing light 240.

Top photovoltaic device 201 creates, or generates, photovoltaic-generated electrical power 253 in response to receiving light 240 from top surface 270 of light source 230. Photovoltaic-generated electrical power 253 from top photovoltaic device 201 is combined with the photovoltaic-generated electrical power 253 created by the other photovoltaic devices included in power conditioning module 227 and is sent to power distribution circuit 210 through electrical connections 284 and 285.

Bottom photovoltaic device 202 creates photovoltaic-generated electrical power 253 in response to receiving light 240 from bottom surface 272 of light source 230. Photovoltaic-generated electrical power 253 from bottom photovoltaic device 202 is combined with the photovoltaic-generated electrical power 253 created by the other photovoltaic devices included in power conditioning module 227, and is sent to power distribution circuit 210 through electrical connections 284 and 285.

Front photovoltaic device 281 creates photovoltaic-generated electrical power 253 in response to receiving light 240 from front surface 275 of light source 230. Photovoltaic-generated electrical power 253 from front photovoltaic device 281 is combined with the photovoltaic-generated electrical power 253 created by the other photovoltaic devices included in power conditioning module 227, and is sent to power distribution circuit 210 through electrical connections 284 and 285.

Back photovoltaic device 280 creates photovoltaic-generated electrical power 253 in response to receiving light 240 from back surface 274 of light source 230. Photovoltaic-generated electrical power 253 from back photovoltaic device 280 is combined with the photovoltaic-generated electrical power 253 created by the other photovoltaic devices included in power conditioning module 227, and is sent to power distribution circuit 210 through electrical connections 284 and 285. Electrical connections 284 and 285 are electrical traces or wires run along the inside or outside of power conditioning module 227 that connect each photovoltaic device 201, 202, 280, and 281 to power distribution circuit 210.

Photovoltaic-generated electrical power 253 is the electrical power collected from the one or more than one photovoltaic device in power conditioning module 227. In the embodiment shown, photovoltaic-generated electrical power 253 is the electrical power generated by photovoltaic devices 201, 202, 280, and 281. In some embodiments only one photovoltaic device is used in power conditioning module 227. In this embodiment electrical power 253 would be the electrical power generated by the single photovoltaic device of power conditioning module 227. In some embodiments other numbers and positioning of photovoltaic devices are used in power conditioning module 227. Power conditioning module 227 can contain any number of photovoltaic devices, and these photovoltaic devices can be electrically connected in many ways. Power conditioning module 227 of power supply 220 includes one or more than one photovoltaic device which is in optical communication with light source 230, and which generate photovoltaic-generated electrical power 253 in response to receiving light 240 from light source 230. In some embodiments a portion of photovoltaic-generated electrical power 253 generated by the photovoltaic devices is used for purposes other than being sent to power output circuit 214. In some embodiments a portion of photovoltaic-generated electrical power 253 generated by the photovoltaic devices is used to power light source 230.

In the embodiment shown in FIG. 2 through FIG. 5, the amount of photovoltaic-generated electrical power 253 collected from photovoltaic devices 201, 202, 280 and 281 is greater than the amount of light source electrical power 252 delivered to light source 230 due to the light amplification capabilities of light source 230, which will be discussed shortly.

In some embodiments light source 230 is included in photovoltaic device 201 202, 280, or 281. For example, in some embodiments block of optical coupling material 208 is a semiconductor material that is doped to become a photovoltaic device. Block of optical coupling material 208 becomes the photovoltaic device. Bock of optical coupling material 208, which is photovoltaic device 201, 202, 280, or 281 in this embodiment, can be designed to include light-emitting device 205 of light source 230. Thus in this embodiment photovoltaic device 201, 202, 280, or 281 includes light source 230.

Light source 230 of power supply 220 can take many different forms. FIG. 6, FIG. 7, and FIG. 8 each show example embodiments of power conditioning module 227 and light source 230 of power supply 220. FIG. 6 and FIG. 7 each show embodiments of light source 230 in which light source 230 is a photoluminescent light source, meaning that light source 230 includes one or more than one photoluminescent material, which emits light in response to absorbing light. The photoluminescent property is used to amplify optical power in power conditioning module 227. In some embodiments, light source 130 is a combination photoluminescent/electroluminescent light source, meaning light source 130 includes an element that emits light in response to receiving light, and includes an element that emits light in response to receiving electricity. FIG. 8 shows an embodiment of light source 230 in which light source 230 is not a photoluminescent light source. Any of the embodiments of power conditioning module 227 shown in FIG. 6, FIG. 7, and FIG. 8 can be used in power supply 220 of FIG. 2 through FIG. 5.

FIG. 6 shows a cross-section of one embodiment of power conditioning module 227 of FIG. 2 through FIG. 5, where power conditioning module 227 includes photoluminescent light source 230, photovoltaic devices 201, 202, 280 (see FIG. 2, FIG. 4, and FIG. 5), and 281 (see FIG. 2, FIG. 4, and FIG. 5), and mirrors 211. In the embodiment shown in FIG. 2 through FIG. 6, light source 230 is rectangular in shape, with photovoltaic devices 201, 202, 280, and 281 covering four surfaces of light source 230. Mirrors 211 cover the two end surfaces 276 and 277 of light source 230. Mirrors 211 keep light 240 from escaping power conditioning module 227 without hitting a photovoltaic device. Mirrors 211 will reflect light that attempts to exit light source 230 at edges 276 or 277 back into light source 230. In this embodiment power input contacts 233 and 234 and power output contacts 222 and 224 are mechanically coupled to mirrors 211 at opposing ends of power conditioning module 227. It is to be understood that many other electrical and mechanical configurations of power conditioning module 227 and light source 230 are possible according to the invention. In some embodiments light source 230 is a shape other than rectangular. In some embodiments light source 230 is covered on all outer surfaces with photovoltaic devices. In some embodiments light source 230 is covered on one surface with one or more than one photovoltaic device. In some embodiments power input or power output contacts are coupled to power conditioning module 227 at places other than mirrors 211.

Photoluminescent light source 230 according to the invention includes one or more than one light-emitting device 205. In the embodiment shown in FIG. 6, light source 230 includes two light-emitting devices 205, where each light-emitting device 205 is a super-bright light-emitting diode which emits light 239 that is in the blue region of the visible spectrum. In this embodiment light-emitting device 205 is an electroluminescent element, meaning it emits light in response to receiving electrical power. In some embodiments light source 230 includes one light-emitting device 205. In some embodiments the one or more than one light-emitting device 205 included in light source 230 is a device other than a light-emitting diode. In some embodiments light-emitting device 205 is a laser emitting light at 532 nm. Light-emitting device 205 can be a light-emitting element, a laser, an organic light-emitting device, a lamp, a laser diode, or any other device which outputs light in response to receiving electrical power. In some embodiments light source 230 includes multiple light-emitting devices 205, where the multiple light-emitting devices 205 are of different types. Light 239 can be any peak wavelength and wavelength range. Light 239 emitted by light-emitting device 205 does not have to be visible light, but can fall anywhere in the light radiation spectrum from ultraviolet through the visible spectrum and the infrared spectrum. In some embodiments light source 230 includes light-emitting devices 205 that emit light of different wavelengths, for example, but not by way of limitation, one light emitting device 205 can emit blue light 239, another light-emitting device 205 can emit green light. Light source 230 can include light emitting devices 205 of any quantity and light-emitting qualities.

In the embodiment shown in FIG. 6, photoluminescent light source 230 includes two light-emitting devices 205, both of which are super-bright light-emitting diodes emitting blue light 239. Light-emitting device 205 emits light 239 with a first peak wavelength and first wavelength range. In this embodiment light 239 is blue in color and is indicated in the figures as solid light ray lines (to ease figure congestion, not all light ray lines 239 are labeled).

Power conditioning module 227 in this embodiment includes optical coupling material 208, which in this embodiment is an optical molding resin. Optical coupling material 208 is a material which is optically transparent to the light used in light source 230. Optical coupling material 208 is used to couple light-emitting devices 205 to photovoltaic devices 201, 202, 280, and 281. Optical coupling material 208 is molded in a rectangle with light-emitting devices 205 molded in optical coupling material 208 in this embodiment. Each light-emitting device 205 receives light source electrical power 252 through light source power electrical connections 236 and 237. In this embodiment balance resistors 207 are placed in series with light-emitting devices 205 at positive light source electrical power connection 236 to balance both the power consumed and the light 239 emitted by each light-emitting device 205. In some embodiments optical coupling material 208 is a material other than optical molding resin. In some embodiments of power supply 220 optical coupling material 208 is not used.

Photoluminescent light source 230 in the embodiment shown in FIG. 6 includes photoluminescent material 241. Photoluminescent material 241 in this embodiment is embedded in optical material 208 such that photoluminescent material 241 is in optical communication with both light-emitting devices 205 and photovoltaic devices 201, 202, 280, and 281. Photoluminescent material 241 is a green phosphor photoluminescent material which emits light 242 with a second peak wavelength and second wavelength range in response to receiving (absorbing) blue light 239 from light-emitting device 205. Light 242 has a peak wavelength in the green range of the visible spectrum and is indicated by dashed light rays in the figures (to ease figure congestion, not all light ray lines 242 are labeled). Optical amplification occurs when photoluminescent material 241 emits more than one green light 242 photon for each blue light 239 photon absorbed. Optical amplification can occur with many different photoluminescent materials and light emitting devices, as is well known in the art of light amplification from stimulated emission as is used in lasers, luminescent solar cells, and other photoluminescent devices. In this embodiment photoluminescent material 241 emits green light 242 in response to absorbing blue light 239, with more than one green light 242 photon being emitted for each blue light 239 photon absorbed. Much of the blue light 239 emitted from light emitting device 205 is absorbed by photoluminescent material 241, but some of blue light 239 leaves light source 230 as light 240 emitted from light source 230. So in this embodiment light source 230 emits light 240, where a portion of light 240 is blue light 239 from light-emitting device 205, and a portion of light 240 is green light 242 emitted by photoluminescent material 241. Thus in this embodiment light source 230 is a combination photoluminescent/electroluminescent light source. Thus in this embodiment light source 230 emits light 240 in response to receiving light source electrical power 252, where light 240 comprises light 239 of a first peak wavelength and first wavelength range, and light 242 of a second peak wavelength and second wavelength range.

Light 240 emitted by light source 230 is received by photovoltaic devices 201, 202, 280, and 281 in this embodiment. One way that photovoltaic devices 201, 202, 280, and 281 can receive light 240 is by absorbing light 240. In some embodiments photovoltaic devices 201, 202, 280, and 281 receive light 240 in other ways. Photovoltaic devices 201, 202, 280, and 281 are designed to cover the top, bottom and front and back surfaces 270, 272, 274, and 275 of light source 230 as discussed earlier. The two end surfaces 276 and 277 of light source 230 are covered by mirrors 211 so that light hitting end surfaces 276 or 277 is reflected back into light source 230. In this way power conditioning module 227 is designed so that as much as possible of light 240 emitted by light source 230 is received by photovoltaic devices 201, 202, 280, and 281.

Photovoltaic devices 201, 202, 280, and 281 receive light 240 from light source 230, and generate photovoltaic-generated electrical power 253 in response. Top photovoltaic device 201 generates photovoltaic-generated electrical power 253 in response to receiving light 240 from top surface 270 of light source 230. Photovoltaic-generated electrical power 253 is collected through electrical connections 284 and 285 as shown in FIG. 6. Similarly, bottom photovoltaic device 202, front photovoltaic device 281, and back photovoltaic device 280 generate photovoltaic-generated electrical power 253 in response to receiving light 240 from light source 230. Light 240 includes light 239 emitting by light-emitting device 205 in response to receiving light source electrical power 252, and light 242 emitted by photoluminescent material 241 in response to receiving light 239 from light-emitting device 205. In this embodiment photovoltaic devices 201, 202, 280, and 281 are chosen to be efficient at generating electricity when receiving light in the green-blue spectral range. In this embodiment the amount of electrical power 253 generated by photovoltaic devices 201, 202, 280, and 281 is greater than the amount of electrical power 252 received by light source 230, due to the optical amplification occurring in light source 230.

The efficiency of power supply 220 in generating power through optical amplification is related to the choice of light-emitting device 205, the choice of photoluminescent material 241, and the choice of photovoltaic devices 201, 202, 280, and 281. Light-emitting device 205 is chosen to efficiently convert light source electrical power 252 into light 239. Photoluminescent material 241 is chosen in this embodiment to convert light 239 into light 242 and perform optical amplification. Optical coupling material 208 optically couples light 240 emitted from light source 230, which comprises both light 239 and light 242, to photovoltaic devices 201, 202, 280, and 281. Photovoltaic devices 201, 202, 280, and 281 are chosen to efficiently convert light 240 received from light source 230 into photovoltaic-generated electrical power 253.

Light-emitting device 205 can be any one or more than one type of light-emitting device and can emit light with any one or more than one peak wavelength and wavelength range in response to receiving light source electrical power 252. Photoluminescent material 241 can be any one or more than one photoluminescent material which absorbs light of any one or more than one peak wavelength and wavelength range, and emits light of any one or more than one peak wavelength and wavelength range. Photovoltaic devices 201, 202, 280, and 281 can be any one or more than one photovoltaic devices which absorb light of one or more than one peak wavelength and wavelength range, and generates photovoltaic-generated electrical power 253 in response. The efficiency of power supply 220 is increased by choosing these elements for maximum electro-optical conversion efficiency and optical amplification. In the embodiment shown in FIG. 6, light-emitting device 205 is a blue super-bright light-emitting diode. Photoluminescent material 241 is a green phosphor which emits green light 242 in response to absorbing blue light 239. In the embodiment shown in FIG. 6, photovoltaic devices 201, 202, 280, and 281 are organic material photovoltaic solar cell devices which generate photovoltaic-generated electrical power 253 in response to absorbing blue-green light. In this embodiment the amount of photovoltaic-generated electrical power 253 generated by photovoltaic devices 201, 202, 280, and 281 is greater than the amount of light source electrical power 252 delivered to light-emitting devices 205 of light source 230. It is to be understood that power supply 220 according to the invention can include other types of light-emitting devices 205, different quantities of light-emitting devices 205, other types of photoluminescent materials 241, different quantities of photoluminescent materials, other types of photovoltaic devices 201, 202, 280, and 281, different quantities of photovoltaic devices, and other mechanical and electrical configurations than those shown in the figures.

FIG. 7 shows a cross-sectional view of a further embodiment of power conditioning module 227 of power supply 220 of FIG. 2 through FIG. 5. This embodiment is similar to the embodiment of power conditioning module 227 shown in FIG. 6, except that two photoluminescent materials 241 and 243 are used in photoluminescent light source 230. Light-emitting devices 205 are two super-bright light-emitting diodes which emit blue light 239 in response to receiving light source electrical power 252, as in the embodiment shown in FIG. 6 and described above.

Light source 230 of FIG. 7 includes optical coupling material 208 molded into a rectangular shape, with light-emitting devices 205, balance resistors 207, and photoluminescent materials 241 and 243 embedded in optical coupling material 208. Optical coupling material 208 puts light-emitting device 205 in optical communication with photoluminescent material 241, photoluminescent material 243, and photovoltaic devices 201, 202, 280, and 281. Mirrors 211 cover edge surfaces 276 and 277 to reflect light back into light source 230. Top photovoltaic device 201 is embedded in top surface 270 of light source 230 so that light 240 exiting light source 230 at top surface 270 is received by top photovoltaic device 201. Bottom photovoltaic device 202 is embedded in bottom surface 272 of light source 230 so that light 240 exiting light source 230 at bottom surface 272 is received by bottom photovoltaic device 202. Back photovoltaic device 280 is embedded in back surface 274 of light source 230 so that light 240 exiting light source 230 at back surface 274 is received by back photovoltaic device 280. Front photovoltaic device 281 is embedded in front surface 275 of light source 230 so that light 240 exiting light source 230 at front surface 275 is received by front photovoltaic device 281.

In the embodiment of FIG. 7, two photoluminescent materials, first photoluminescent material 241, and second photoluminescent material 243, are embedded in optical coupling material 208 of light source 230. Light-emitting devices 205 emit blue light 239 with a first peak wavelength and first wavelength range in response to receiving light source electrical power 252 through electrical connections 236 and 237. First photoluminescent material 241 emits green light 242 with a second peak wavelength and second wavelength range in response to absorbing blue light 239 emitted by light-emitting device 205, as discussed with respect to FIG. 6.

Second photoluminescent material 243 is a blue-green phosphor photoluminescent material which emits blue-green light 244 with a third peak wavelength and third wavelength range in response to absorbing blue light 239 emitted by light-emitting device 205. Light 244 is indicated by dashed-dotted light ray lines in FIG. 7. Not all light rays 244 are labeled, to avoid figure congestion. In some embodiments the first peak wavelength, the second peak wavelength and the third peak wavelength are all different from each other.

A portion of blue light 239 exits light source 230 as part of light 240. Green light 242 exits light source 230 as part of light 240. Blue-green light 244 exits light source 230 as part of light 240. In this way light 240 emitted by light source 230 includes light 239 with a first peak wavelength and first wavelength range, light 242 with a second peak wavelength and second wavelength range, and light 244 with a third peak wavelength and third wavelength range.

The optical conversion from light 239 to light 242 performed by photoluminescent material 241 is a light-amplifying conversion, meaning for every blue light 239 photon absorbed by photoluminescent material 241, more than one green light 242 photon is emitted by photoluminescent material 241. The optical conversion from light 239 to light 244 performed by photoluminescent material 243 is a light-amplifying conversion, meaning for every blue light 239 photon absorbed by photoluminescent material 243, more than one blue-green light 244 photon is emitted by photoluminescent material 243. Due to the light-amplifying optical conversions, a greater amount of light 240 reaches photovoltaic devices 201, 202, 280, and 281 than if there were no photoluminescent materials in light source 230.

Photovoltaic devices 201, 202, 280, and 281 generate photovoltaic-generated electrical power 253 in response to receiving light 240 from light source 230. Due to the light-amplifying optical conversions occurring in light source 230, the amount of photovoltaic-generated electrical power 253 is greater than the amount of light source electrical power 252 received by light source 230. Power output circuit 214 receives photovoltaic-generated electrical power 253 and delivers electrical output power 248 from power supply 220 through connection 222 and 224 in response. The amount of electrical output power 248 delivered (supplied) by power supply 220 is greater than the amount of input power 235 received by power supply 220 due to the light-amplification properties of light source 230. For example, in one embodiment of power supply 220 as shown in FIG. 2 through FIG. 5 and FIG. 7, input power 235 is 2.7 volts at 10 milliamps, which is received by light source power distribution circuit 216. Light source power distribution circuit 216 delivers to light source 230 light source electrical power 252 at 2.7 volts at 10 milliamps. Photovoltaic devices 201, 202, 280, and 281 each generate 3 volts at 20 milliamps of photovoltaic-generated electrical power 253 in response to receiving light source electrical power 252. In the embodiments shown photovoltaic devices 201, 202, 280, and 281 are connected in parallel, such that in this example embodiment power output circuit 214 would receive 3 volts at 80 milliamps of photovoltaic-generated electrical power 253. Thus power output circuit 214 delivers 3 volts at 80 milliamps of output power 248 in this embodiment. In a different embodiment where photovoltaic devices 201, 202, 280, and 281 are connected in series, power output circuit 214 receives 12 volts at 20 milliamps of photovoltaic-generated electrical power 253 in this example, and power output circuit 214 delivers 12 volts at 20 milliamps of output power 248. In this example embodiment power supply 220 includes photoluminescent light source 230 which generates light 240 in response to receiving light source electrical input power 252. Power supply 220 also includes photovoltaic devices 201, 202, 280, and 281 in optical communication with light source 230, such that photovoltaic devices 201, 202, 280, and 281 generate photovoltaic-generated output power 253 in response to receiving light 240 from light source 230. As shown in this example, the amount of photovoltaic-generated output power 253 generated by photovoltaic devices 201, 202, 280, and 281 is greater than the amount of light source electrical input power 252 received by light source 230.

In the embodiment shown in FIG. 2 through FIG. 5 and FIG. 7, power supply 220 includes photoluminescent materials 241 and 243 in optical communication with light-emitting devices 205, where photoluminescent materials 241 and 243 emit light 242 and 244 in response to receiving light 239 from light-emitting devices 205. In this embodiment power supply 220 includes photovoltaic devices 201, 202, 280, and 281 in optical communication with photoluminescent materials 241 and 243, where photovoltaic devices 201, 202, 280, and 281 generate photovoltaic-generated electrical power 253 in response to receiving light 242 and 244 from photoluminescent materials 241 and 243. In this embodiment the amount of photovoltaic-generated electrical power 253 generated by photovoltaic devices 201, 202, 280, and 281 is greater than the amount of light source electrical power 252 consumed by light-emitting devices 205.

FIG. 8 shows an additional embodiment of power conditioning module 227 of power supply 220 according to the invention. In this embodiment light source 230 does not include any photoluminescent materials, so light source 230 is not a photoluminescent light source. Light source 230 in this embodiment includes rectangular block of optical coupling material 208, with light-emitting devices 205 embedded in optical coupling material 208. Light-emitting devices 205 can be any light-emitting devices, but in the embodiment of FIG. 8 they are two super-bright light-emitting diodes which emit blue light 239 in response to receiving light source electrical power 252 through electrical connections 236 and 237. Balance resistors 207 are connected to positive electrical connections 236 of each light-emitting device 205 and are also embedded in optical coupling material 208. Light 240 emitted from light source 230 includes blue light 239 emitted by light-emitting devices 205. In some embodiments light emitting devices 205 emits other peak wavelengths, and wavelength ranges of light. In some embodiments light-emitting devices 205 includes various types of light-emitting devices which emit different colors, peak wavelengths, and peak wavelength ranges of light. In these embodiments light 240 emitted by light source 230 includes the light emitted by light-emitting devices 205 which exits light source 230.

In the embodiment shown in FIG. 8, photovoltaic devices 201, 202, 280, and 281 are embedded in optical coupling material 208 and are in optical communication with light-emitting devices 205. Top photovoltaic device 201 is embedded in top surface 270 of optical coupling material 208 of light source 230 such that top photovoltaic device 201 receives light 240 emitted by light source 230 from top surface 270. Top photovoltaic layer 201 generates photovoltaic-generated electrical power 253 in response to receiving light 240 from light source 230, as explained earlier. Bottom photovoltaic device 202 is embedded in bottom surface 272 of optical coupling material 208 of light source 230 such that bottom photovoltaic device 202 receives light 240 emitted by light source 230 from bottom surface 272. Bottom photovoltaic device 202 generates photovoltaic-generated electrical power 253 in response to receiving light 240 from light source 230, as explained earlier. Back photovoltaic device 280 is embedded in back surface 274 of optical coupling material 208 of light source 230 such that back photovoltaic device 280 receives light 240 emitted by light source 230 from back surface 274. Back photovoltaic device 280 generates photovoltaic-generated electrical power 253 in response to receiving light 240 from light source 230, as explained earlier. Front photovoltaic device 281 is embedded in front surface 275 of optical coupling material 208 of light source 230 such that front photovoltaic device 281 receives light 240 emitted by light source 230 from front surface 276. Front photovoltaic device 281 generates photovoltaic-generated electrical power 253 in response to receiving light 240 from light source 230, as explained earlier. Photovoltaic-generated electrical power 253 is received by power output circuit 214, which delivers output power 248 in response. In this way power supply 220 includes a block of optical coupling material 208, with light-emitting devices 205 embedded in optical coupling material 208, where light-emitting devices 205 emit light 239 in response to receiving light source electrical power 252. In this embodiment power supply 220 includes photovoltaic devices 201, 202, 280, and 281 embedded in optical coupling material 208 of light source 230, where photovoltaic devices 201, 202, 280, and 281 are in optical communication with light-emitting devices 205, and generate photovoltaic-generated electrical power 253 in response to receiving light 240 from light source 230.

It is to be understood that the embodiments of power supply 220 shown in the figures are examples only. Many other embodiments of power supply 220 according to the invention can be formed using the elements and teachings discussed. Power supply 220 can be many different shapes and sizes, and accept and deliver many different voltages and currents, and forms of output power. Different mechanical and electrical configurations of power distribution circuit 210 and power conditioning module 227 can be used to provide different electrical outputs, mechanical mountings, and electrical input-output options. Power supply 220 according to the invention can be a board-mount device, a surface-mount device, or accommodate any other input-output configuration or protocol.

In some embodiments power conditioning module 227 of power supply 220 is used to electrically isolate an input signal from an output signal. In this application power supply 220 can be used to electrically isolate power input signal 235 from power output signal 248. This can be done because the input electrical connections 233 and 234 are not electrically connected to the output connection 222 and 224, but are instead optically coupled. In addition, the signals from photovoltaic cells are electrically clean, with little noise or other corrupting elements. This can make power supply 220 useful in audio buffers, for example, as well as other signal circuits and devices.

In some embodiments power supply 220 according to the invention is used as a power converter, a converter transmitter, or a power transformer. Power supply 220 can be used to perform these functions while generating a minimum of heat, for example.

It has been shown how power supply 220 according to the invention uses one or more than one photoluminescent material and one or more than one photovoltaic device to amplify and generate power using electro-optical conversions and optical amplification. Power supply 220 as described can be used in many different applications, including but not limited to consumer electronics, audio, communication, telecom, space, wired and wireless communications, and other product applications. Power supply 220 according to the invention can be used to amplify power, to generate power, to perform signal isolation, power conversion or transformation, or other power conditioning functions.

Figure 9:
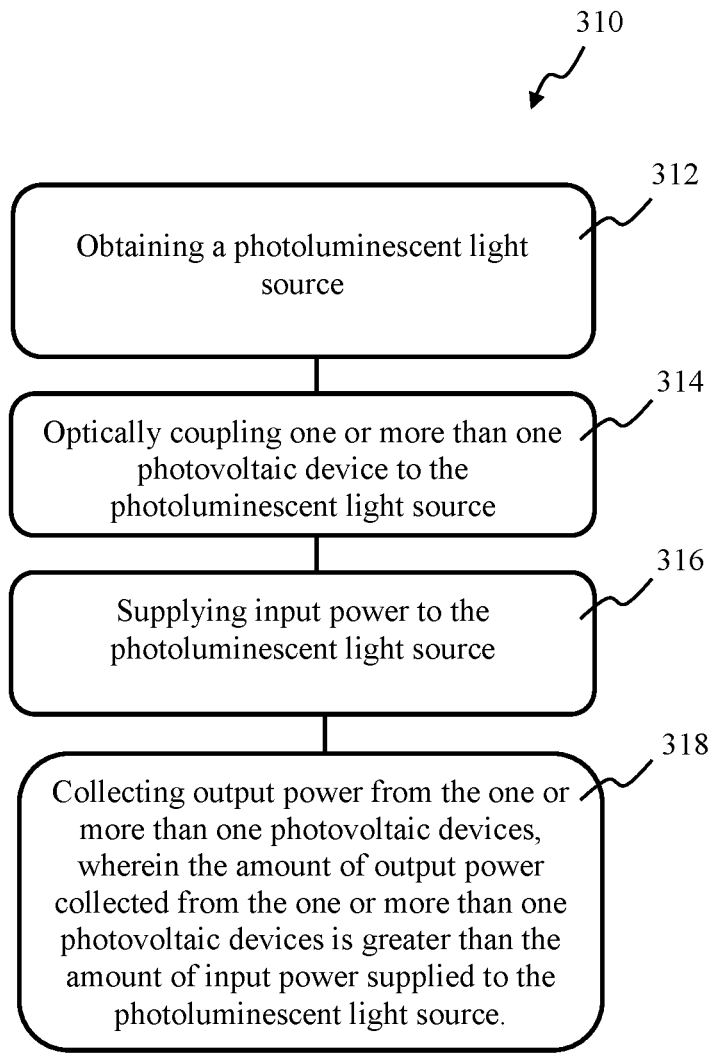
FIG. 9 illustrates method 310 of generating electrical power according to the invention.

FIG. 9 illustrates method 310 of amplifying power according to the invention, which includes step 312 obtaining a photoluminescent light source, step 314 optically coupling one or more than one photovoltaic devices to the photoluminescent light source, step 316 supplying input power to the photoluminescent light source, and step 318 collecting output power from the one or more than one photovoltaic devices, wherein the amount of output power collected from the one or more than one photovoltaic devices is greater than the amount of input power supplied to the photoluminescent light source.

Step 312 can include many other steps. Step 312 obtaining a photoluminescent light source can include building a photoluminescent light source. In some embodiments step 312 includes optically coupling a light-emitting device to a photoluminescent material. In some embodiments step 312 includes using an optical grade resin to optically couple a light-emitting device to a photoluminescent material. In some embodiments step 312 includes embedding a light-emitting device and a photoluminescent material in an optical grade resin. In some embodiments step 312 according to the invention includes embedding a photoluminescent material in an optical coupling material. In some embodiments step 312 includes embedding a light-emitting device in an optical coupling material. In some embodiments step 312 includes embedding more than one type of photoluminescent material into an optical coupling material. In some embodiments step 312 includes molding an optical coupling material which includes one or more than one type of photoluminescent materials into a photoluminescent layer. In some embodiments step 312 includes embedding a light-emitting device in a photoluminescent layer. In some embodiments step 312 includes optically coupling a light-emitting device to a photoluminescent layer. In some embodiments step 312 includes optically stimulating a photoluminescent material with a light-emitting device. Step 312 can include placing a photoluminescent material in optical communication with a light-emitting device, such that the photoluminescent material emits light in response to receiving light from the light-emitting device.

Step 314 optically coupling one or more than one photovoltaic device to the photoluminescent light source can include many other steps. In some embodiments step 314 includes optically bonding the photoluminescent light source to the one or more than one photovoltaic devices. In some embodiments step 314 includes optically bonding one or more than one photovoltaic device to the photoluminescent light source. In some embodiments step 314 includes molding a portion of one or more than one photovoltaic device into the photoluminescent light source. In some embodiments step 314 includes optically bonding a top photovoltaic device to the top surface of the photoluminescent light source. In some embodiments step 314 includes optically bonding a bottom photovoltaic device to the bottom surface of the photoluminescent light source. In some embodiments step 314 includes optically bonding a front photovoltaic device to the front surface of the photoluminescent light source. In some embodiments step 314 includes optically bonding a back photovoltaic device to the back surface of the photoluminescent light source. In some embodiments step 314 include molding a top photovoltaic device into the top surface of the light source. In some embodiments step 314 includes molding a bottom photovoltaic device into the bottom surface of the photoluminescent light source. In some embodiments step 314 include molding a front photovoltaic device into the front surface of the photoluminescent light source. In some embodiments step 314 includes molding a back photovoltaic device into the back surface of the photoluminescent light source. In some embodiments step 314 includes placing the one or more than one photovoltaic devices adjacent to the photoluminescent light source such that the photovoltaic device receives light from the photoluminescent light source. Step 314 can include any step which optically couples the one or more than one photovoltaic devices to the photoluminescent light source such that the one or more than one photovoltaic devices generate electrical power in response to receiving light from the photoluminescent light source.

Step 316 supplying input power to the photoluminescent light source can include many other steps. In some embodiments step 316 includes applying electrical power of 2.7 volts and 10 milliamps to the photoluminescent light source. In some embodiments step 316 includes applying electrical power to the input electrical connections of the photoluminescent light source, where the photoluminescent light source emits light in response. Step 316 can include any step involved in providing power to the photoluminescent light source, where the photoluminescent light source emits light in response to receiving the power.

Step 318 collecting output power from the one or more than one photovoltaic device, wherein the amount of output power collected from the one or more than one photovoltaic device is greater than the amount of input power supplied to the light source, can include many other steps. In some embodiments step 318 includes collecting output power from a top photovoltaic device. In some embodiments step 318 includes collecting output power from a bottom photovoltaic device. In some embodiments step 318 includes collecting output power from a back photovoltaic device. In some embodiments step 318 includes collecting output power from a front photovoltaic device. In some embodiments step 318 includes electrically connecting more than one photovoltaic device in series. In some embodiments step 318 includes electrically connecting more than one photovoltaic device in parallel.

A method of optically isolating a power signal is disclosed which includes optically coupling one or more than one photovoltaic device to a photoluminescent light source, supplying input power to the photoluminescent light source, and collecting output power from the one or more than one photovoltaic devices. The step of optically coupling one or more than one photovoltaic device to a photoluminescent light source can include any of the steps discussed above in regard to step 314 of method 310. Supplying input power to the photoluminescent light source can include any of the steps discussed above with regard to step 316 of method 310. Collecting output power from the one or more than one photovoltaic device can include many other steps. In some embodiments collecting output power from the one or more than one photovoltaic device includes collecting output power from a top photovoltaic device. In some embodiments collecting output power from the one or more than one photovoltaic device includes collecting output power from a bottom photovoltaic device. In some embodiments collecting output power from the one or more than one photovoltaic device includes collecting output power from a back photovoltaic device. In some embodiments collecting output power from the one or more than one photovoltaic device includes collecting output power from a front photovoltaic device. In some embodiments collecting output power from the one or more than one photovoltaic device includes electrically connecting more than one photovoltaic device in series. In some embodiments collecting output power from the one or more than one photovoltaic device includes electrically connecting more than one photovoltaic device in parallel.

Figure 10:
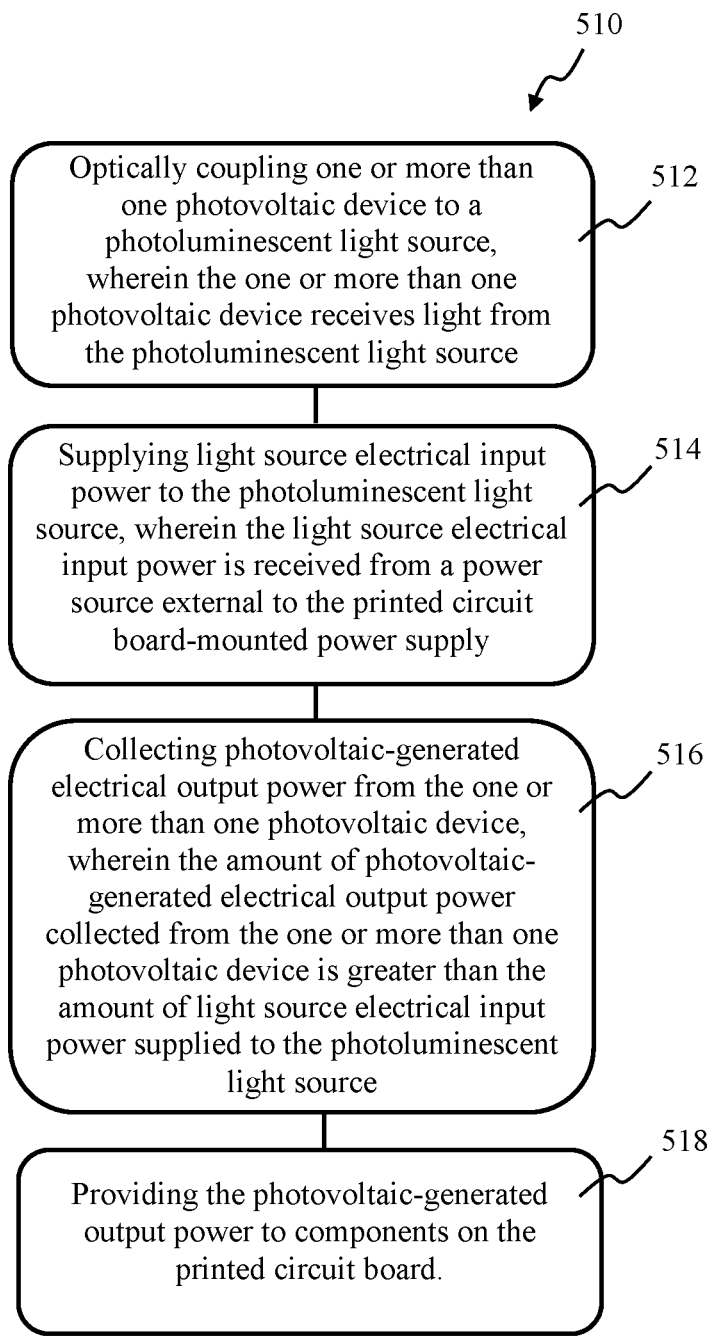
FIG. 10 illustrates method 510 according to the invention of amplifying power for components mounted on a printed circuit board using a printed circuit board-mounted power supply.

FIG. 10 illustrates method 510 according to the invention of amplifying power for components mounted on a printed circuit board using a printed circuit board-mounted power supply. Method 510 includes step 512 of optically coupling one or more than one photovoltaic device to a photoluminescent light source, where the one or more than one photovoltaic device receives light from the photoluminescent light source. Method 510 of amplifying power for components mounted on a printed circuit board using a printed circuit board-mounted power supply also includes step 514 of supplying light source electrical input power to the photoluminescent light source, where the light source electrical input power is received from a power source external to the printed circuit board-mounted power supply. Method 510 also includes step 516 of collecting photovoltaic-generated electrical output power from the one or more than one photovoltaic device, wherein the amount of photovoltaic-generated electrical output power collected from the one or more than one photovoltaic device is greater than the amount of light source electrical input power supplied to the photoluminescent light source. And method 510 according to the invention includes step 518 of providing the photovoltaic-generated electrical output power to components mounted on the printed circuit board.

Method 510 according to the invention can include many other steps. In some embodiments method 510 includes the step of creating a photoluminescent light source. In some embodiments the step of creating a photoluminescent light source includes the step of optically coupling a light-emitting device to a photoluminescent material. In some embodiments the step of creating a photoluminescent light source includes the step of embedding the light-emitting device in a block of optical coupling material. In some embodiments the step of creating a photoluminescent light source includes the step of embedding the photoluminescent material in a block of optical coupling material. In some embodiments the step of creating a photoluminescent light source includes the step of embedding a first photoluminescent material in a block of optical coupling material. In some embodiments the step of creating a photoluminescent light source includes the step of embedding a second photoluminescent material in a block of optical coupling material. In some embodiments method 510 includes the step of embedding the one or more than one photovoltaic device in the block of optical coupling material.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims, for example, power supply 220 does not have to be a printed circuit board-mounted device. Power supply 220 can be a standalone device, a portable power supply, a power generator, or any other type of device that supplies electrical power when needed. Appendix A attached includes further drawings and description of power supply 220 according to the invention and is incorporated entirely herein.

The invention claimed is:

1. A method of amplifying power for components mounted on a printed circuit board using a printed circuit board-mounted power supply, the method comprising:
    optically coupling one or more than one photovoltaic device to a photoluminescent light source, wherein the one or more than one photovoltaic device receives light from the photoluminescent light source;
    supplying light source electrical input power to the photoluminescent light source, wherein the light source electrical input power is received from a power source external to the printed circuit board-mounted power supply;
    collecting photovoltaic-generated electrical output power from the one or more than one photovoltaic device;
    providing the photovoltaic-generated electrical output power to components mounted on the printed circuit board; and
    creating the photoluminescent light source, wherein the step of creating the photoluminescent light source comprises a step of optically coupling a light-emitting device that emits high energy light photons in response to receiving light source electrical input power to a photoluminescent material, wherein the photoluminescent material absorbs the high energy light photons emitted by the light-emitting device, and emits more than one low energy light photon for each of the high energy light photons absorbed.

2. The method of claim 1, wherein creating the photoluminescent light source further comprises the steps of:
    embedding the light-emitting device in a block of optical coupling material; and
    embedding the photoluminescent material in the block of optical coupling material.

3. The method of claim 2, wherein the photoluminescent material is a first photoluminescent material, and wherein creating the photoluminescent light source further comprises a step of embedding a second photoluminescent material in the block of optical coupling material.

4. The method of claim 3, further comprising embedding the one or more than one photovoltaic device in the block of optical coupling material.

* * * * *